United States Patent [19]

Fuchs et al.

[11] Patent Number: 4,817,829

[45] Date of Patent: Apr. 4, 1989

[54] DISPENSER FOR FLOWABLE MEDIA

[75] Inventors: Karl-Heinz Fuchs, Radolfzell; Lothar Graf, Rielasingen; Heinz-Peter Forsbach, Lohmar 1/Grimberg, all of Fed. Rep. of Germany

[73] Assignees: Ing. Erich Pfeiffer GmbH; Bayer AG, both of Fed. Rep. of Germany

[21] Appl. No.: 831,645

[22] Filed: Feb. 20, 1986

[30] Foreign Application Priority Data

| | | | |
|---|---|---|---|
| Feb. 21, 1985 | [DE] | Fed. Rep. of Germany | 3505911 |
| Jun. 15, 1985 | [DE] | Fed. Rep. of Germany | 3521580 |

[51] Int. Cl.[4] ............................................ G01F 11/00

[52] U.S. Cl. .................................... 222/259; 222/321; 141/27; 141/310

[58] Field of Search ............... 222/256, 257, 259, 260, 222/387–405, 319, 388, 321, 320, 378, 327, 386, 7, 386.5; 141/20, 27, 258, 285, 310, 3; 53/473

[56] References Cited

U.S. PATENT DOCUMENTS

| | | | |
|---|---|---|---|
| 1,998,751 | 4/1935 | Creveling | 222/259 |
| 1,998,752 | 4/1935 | Creveling | 222/259 |
| 2,112,450 | 3/1938 | Tear | 222/257 |
| 2,268,592 | 1/1942 | Hothersall | 141/27 |
| 2,800,254 | 7/1957 | Dinkelkamp | 222/260 |
| 2,936,933 | 5/1960 | Malec | 222/260 X |
| 3,363,093 | 1/1968 | Schmitt | 240/41.35 |
| 3,908,870 | 9/1975 | Nozawa et al. | 222/321 |
| 4,134,523 | 1/1979 | Hansen et al. | 222/389 |
| 4,438,871 | 3/1984 | Eckert | 222/256 X |
| 4,530,449 | 7/1985 | Nozawa et al. | 222/383 X |
| 4,545,696 | 10/1985 | Carluccio | 401/75 X |
| 4,552,161 | 11/1985 | Hill et al. | 401/175 X |
| 4,621,935 | 11/1986 | Sussman | 401/75 X |
| 4,702,399 | 10/1987 | Davis | 222/390 |

FOREIGN PATENT DOCUMENTS

| | | | |
|---|---|---|---|
| 25224 | 3/1981 | European Pat. Off. . | |
| 3006680 | 8/1981 | Fed. Rep. of Germany . | |
| 3104726 | 8/1982 | Fed. Rep. of Germany | 222/386 |
| 3304926 | 8/1984 | Fed. Rep. of Germany . | |
| 3530486 | 3/1987 | Fed. Rep. of Germany | 222/259 |
| 2512787 | 3/1983 | France | 222/386 |
| 891908 | 3/1962 | United Kingdom | 222/321 |

*Primary Examiner*—Michael S. Huppert

*Attorney, Agent, or Firm*—Steele, Gould & Fried

[57] ABSTRACT

A dispenser for flowable media, particularly pasty pharmaceutical or cosmetic products, has a drag piston guided in a reservoir and is filled through a connecting piece through the drag piston. A riser is connected to a discharge pump and a reservoir closure. Thus, the interior of the reservoir to be filled can be well sealed from the outside during filling and ensures a clean, hygienic filling and simple installation of the dispenser. The drag piston is advanced to close the ventilation openings with a slide type control and the riser and discharge pump are filled with the medium following the filling process.

40 Claims, 4 Drawing Sheets

43a
41a
42a
11a
12a
53a
4a
5a
18a
24a
2a
30a
3a
19a
8a
27a
34a
35a
32a
31a
26a
51a
52a
50a
44a
29a
6a
23a

DISPENSER FOR FLOWABLE MEDIA

BACKGROUND OF THE INVENTION

The present invention relates to a dispenser for flowable media, particularly pasty pharmaceutical or cosmetic products, with a reservoir receiving a discharge pump at the open end after filling. In the vicinity of an end remote from a closed base the reservoir has a filling opening for its filling chamber which is empty prior to filling and which after filling forms the storage area. The reservoir defines a path for a drag piston facing the storage area and limiting the same towards the bottom and which particularly after filling is displaceable from a filling position into a working position closing the storage area. The reservoir is traversed by a riser, on which the drag piston is guided, the outer end of the riser being provided for connection with a discharge opening of the discharge pump.

A dispenser is known (Offenlegungstag [German Patent Publication] 30 06 680, dated Aug. 27, 1981) in which the drag piston is completely removed from the reservoir during filling and consequently the filling of said reservoir takes place through its upper open end. Thus, in the case of this dispenser, the filling chamber is not closed by the drag piston and instead the latter is only placed after filling over the introduced medium, so that the drag piston then closes the reservoir. Thus, a clean filling of the reservoir is relatively difficult. Difficulties are encountered in inserting the drag piston, because an overpressure occurs opposing insertion of the piston and builds up between the drag piston and the top of the filled medium.

It is also known, for the purpose of filling the reservoir, to make the base such that it is only fitted from its end after filling the reservoir. However, this can easily lead to the inclusion of air between the base and the associated side of the filled medium, which causes problems during the discharge of the medium using the discharge pump. This construction is also prejudicial to a clean filling operation.

SUMMARY OF THE INVENTION

The solution presented by the invention provides a dispenser of the aforementioned type which, in a simple manner, ensures a clean and hygenic filling operation.

In the case of a dispenser of the aforementioned type, according to the invention the problem is solved by a filling opening in the drag piston such that during filling, the piston defines the filling chamber at the associated end. At least one closeable ventilation opening for the filling chamber is provided in the vicinity of the drag piston when in position for filling. Thus, although the reservoir and its base are closed for filling purposes, before or at the latest at the start of filling, closure is accomplished by the drag piston with the exception of a relatively small filling opening. Thus, the drag piston no longer has to be moved into position after filling and instead hygienically seals the filling end of the reservoir until the apparatus is emptied. The air escaping from the reservoir can pass into the atmosphere during filling through the ventilation opening.

It is also conceivable before or simultaneously with the start of filling to insert the riser, or the riser together with the drag piston as a combined subassembly, into the reservoir and then to fill the filling chamber from bottom to top through the riser. In this case, the filling opening is in the vicinity of the outer end of the riser and after filling the riser must be joined to the discharge pump. For fitting the riser to the discharge pump beforehand and in order to be able to fit the riser in a subassembly combined with the discharge pump, it is appropriate if the filling opening is directly defined by the drag piston, so that a relatively large filling opening cross-section can be obtained. This is particularly the case if the drag piston does not have a separate filling opening, which would subsequently have to be closed by a separate operation. Instead the filling opening is formed by the drag piston opening which receives the riser. The drag piston is designed for sealed guidance on the riser, including the sealing member, and consequently forms a connecting piece for a filling nozzle of a filling means bounded by at least one sealing lip. After removing the filling nozzle from the drag piston, the riser can be immediately inserted.

Very high cleanliness and hygiene can be assured, if the ventilation opening is, in particular, closeable by movement of the drag piston from the filling position to the initial working position. Thus, the ventilation opening is closed immediately following filling or virtually at the time of completion of filling on transferring the drag piston into the working position. This virtually precludes penetration of bacteria or the like into the medium and ensures a high sterility, which allows the filled dispenser to be stored for several years, e.g., four or more years, even if no preservatives are added to the medium. The dispenser according to the invention is, e.g., suitable for filling with and the storage and discharge of anti-infectants, antimycotics, antiphlogistics and similar media.

For simple, rapid movement of the drag piston out of the filling position, the drag piston is displaceably guided on the reservoir member from the filling position to the working position and has on its outer face an abutment stop for engaging a drive stop. The drive stop in particular is connected to the riser and/or discharge pump. The storage chamber is shorter than the filling chamber by an amount corresponding to the length of the drag piston along its driving path. Thus, the filling chamber can be filled without including air or the like, i.e., up to where the filled medium engages on the associated drag piston face. The drag piston is then initially pressed downwardly into the reservoir simultaneously with the installation of the discharge pump and optionally the riser by a predetermined initial driving stroke by the use of direct mechanical action.

Both for further improving the hygienic conditions and to ensure that the dispenser discharges the full desired medium quantity during the first acutation of the discharge pump after filling and correct closure, it is advantageous if the storage chamber and preferably also the rise and pump chamber of the discharge pump are completey filled with the medium, i.e., without any gaps or air inclusions. This can be simply achieved according to the invention in that the filling of the discharge pump chamber and optionally the riser takes place during the initial drag piston displacement following the filling of the storage chamber. Preferably, the displacement volume corresponding to the initial driving stroke of the drag piston, is at least approximately as large as the reception volume of the pump chamber and optionally the riser. Particularly, if during this displacement of the drag piston, the discharge channel of the discharge pump, which may optionally be closed in the inoperative position by a valve, is opened and the discharge pump is held in an actuation position at the end of its pump travel, then the medium displaced from the reservoir can rise in a simple manner into the riser and finally into the discharge pump or its chamber. If only the riser is used in this process, it is immersed in the stored medium and thereby also causes a corresponding volume from the reservoir to move into the riser or the discharge pump.

In order that the riser can easily be introduced into the drag piston and engaged by its sealing members, it is appropriate if the free end of the riser is tapered to a smaller width than the filling opening conically tapered. In this and other embodiments of the invention a very simple fitting is obtained if the drive stop forms a single component with the container closure carrying the discharge pump and/or is constructed in one piece with the riser. The drive stop in particular has an engaging drive cap engaging in the open end of the reservoir adjacent to the drag piston sealing members. This prevents the drive stop coming into contact with any drag piston sealing member and possibly causing damage. The drag piston can, e.g., have a front end wall facing the reservoir base, with the sealing members projecting back. The abutment stop appropriately is formed by the back of the end wall.

It is also possible according to the invention to reliably close the ventilation opening without special effort following filling. This is achieved in that the ventilation opening is closeable in slide-controlled manner with respect to the storage chamber and preferably the drag piston forms the slide uncovering the ventilation opening during the filling position and covers it while in the working position. A very simple construction is obtained if the ventilation opening is connected via a ventilation duct to the outside of the dispenser and this is preferably provided by connecting the ventilation duct to a slot on the inner circumferential surface of the open end portion of the reservoir and/or whose inner end forms the ventilation opening.

According to a further development of the invention, the slide is formed by an annular sealing lip of the drag piston preferably the lip seals the storage chamber along the piston path or contact surface. The annular or ring sealing lip particularly projects in inclined manner from the drag piston counter to the drag direction and/or is provided on the front piston end in the drag direction. The cross-section of the ring sealing lip can be relatively short and have a high rigidity, so that it ensures a precisely defined closing of the ventilation opening and there is no need to provide a separate seal or packing.

To further simplify the manipulation of the dispenser during fitting and filling, in the filling position the drag piston is located in the vicinity of a reservoir portion whose internal cross-sectional is slightly wider than the piston contact surface and which in particular extends up to the open end face of the reservoir. The reservoir portion preferably extending via a sloping annular shoulder into the piston contact surface or path and/or in the filling position forms an engagement annular shoulder for the front ring sealing lip of the piston in the drag direction which is traversed by the ventilation opening. The ventilation opening being a groove. Thus, the drag piston can be inserted relatively easily up to the filling position and the latter is accurately defined by the annular shoulder acting as an abutment. As the drag piston engages elastically, namely, by the associated ring sealing lip bearing against the annular shoulder, the drag piston is fixed in the filling position in the manner of a spring catch, which can be overcome by a correspondingly high force acting on the drag piston. Simultaneously, the ventilation opening is closed.

The guidance and sealing of the drag piston in the case of this easy motion is significantly improved according to a further inventive feature in that the ringed cup-shaped drag piston, for guidance on the piston path and/or on the riser, is provided with at least two successively arranged ring sealing lips. A rear lip belonging to the riser can form the connecting piece for the filling nozzle and can be internally provided with a further ring sealing lip for engaging on the nozzle. Appropriately the ring sealing lips cross-sectionally project at a slope with respect to the sealing surface, counter to the drag direction, i.e., the lips belonging to the piston path are rearwardly conically widened and the lips belonging to the riser are rearwardly tapered in a conical or frustum-like manner.

When the riser has been filled and the discharge pump is to be connected thereto, or if filling takes place prior to inserting the riser and the latter is then fitted together with the discharge pump, the reliability of the connection between riser and discharge pump is improved if the outer end of the riser, for the connection of the discharge pump, forms a connecting member of a preferably telescopic plug-in line connection, which is in particular formed by two sockets. Preferably, the connecting member of the riser is formed by its end portion externally engaging over the discharge pump connecting member and/or an inner sleeve engaging in the discharge pump connecting member.

The construction according to the invention is particularly suitable for those dispensers in which the discharge pump is constructed as a piston pump and in which, preferably, there is a check valve, such as a ball valve between the pump piston and the riser. Thus, during installation, the discharge pump can be held in a simple manner in its operating state.

For example, through creeping, some media might tend to migrate in very fine cracks defined between the piston and its contact surface and consequently form a type of bridge between the two sides of the piston. This can occur with grease-containing products, such as pasty products. Particularly with these products it is advantageous if, according to a further feature of the invention, the empty space of the reservoir above the drag piston is sealed with respect to the atmosphere when the discharge pump is in the inoperative mode or position, so that any product traces entering the space are also sealed in sterile manner from the outside. In a simple embodiment, the discharge pump casing is inserted in the reservoir in sealed manner, preferably by means of an annular flange on its casing with an inner slot of a closure connected in sealed manner with the reservoir, the discharge pump being additionally provided with an air compensating means closed, in sealed manner, in its inoperative mode or position. The air compensating means for the empty space thus passes exclusively through the discharge pump, interposing a valve which is forcibly closed when the discharge pump is in the inoperative position, so that in the inoperative position and consequently when the dispenser is in the storage state, the empty space is hermetically double sealed against the atmosphere, namely, once by the sealed connection of the pump casing with the reservoir and then by the closed air compensation means. Nevertheless, a simple connection of the discharge pump to the reservoir in the manner of a snap connection is possible. For example, the discharge pump can be hygienically fitted to the filled base part of the reservoir, together with the cup-shaped reservoir closure in a subassembly.

The inventive construction makes it possible to simply construct the dispenser in such a way that it can be substantially completely emptied, including the riser and the discharge pump. This can be advantageously achieved in that there is at least one ventilation duct for the riser, particularly on the outer circumference of the riser, which emanates from the bottom level of the reservoir and which, in the bottom end position of the drag piston, opens a ventilation connection from the empty space of the reservoir to the end of the riser. The ring sealing lip of the drag piston passes over an end of this ventilation connection remote from the bottom, preferably shortly before reaching the end position, also in the manner of a slide control. If the drag piston engages on the reservoir bottom and consequently reaches its relevant end position, then by further actuation of the discharge pump, the riser and the pump chamber can be completely sucked empty, because this construction leads to the lower end of the riser being connected to a ventilation means.

As a result of the inventive construction of the dispenser, both an accurately dosed discharge of media and also the discharge of relatively viscous media are possible, which ensures a universal use of the dispenser. This advantage is achieved in a surprisingly simple manner, particularly in that the dispenser comprises a per se known atomizing pump and a reservoir with a drag or climbing piston, because the action of said piston so aids the suction behavior of the discharge pump or the flow behavior of the medium that with an atomizing pump which is not really intended for highly viscous media and is instead intended for highly fluid media, it is possible to achieve a reproducibly, accurately dosed discharge of media having a relatively high viscosity. The discharge pump can be constructed according to German Pat. No. 13 02 372 (U.S. Pat. No. 3,363,093), but appropriately has an abutment shoulder for the pump piston acting at the end of the pump stroke for the forced opening of the delivery valve in accordance with European Pat. No. 00 25 224. Reference should be made to these publications for further features and effects of the present invention.

This and further features of the preferred embodiments of the invention can be gathered from the description and the drawings, whereby the individual features can be realized individually or in random combinations in an embodiment of the invention and in other fields.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
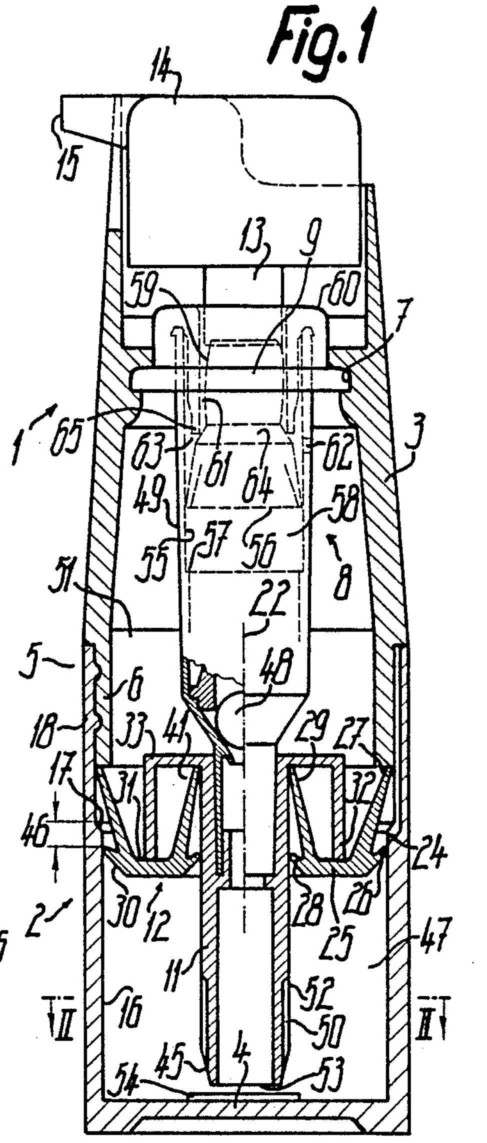
FIG. 1 illustrates a dispenser according to the invention, partly in axial section.
Figure 3:
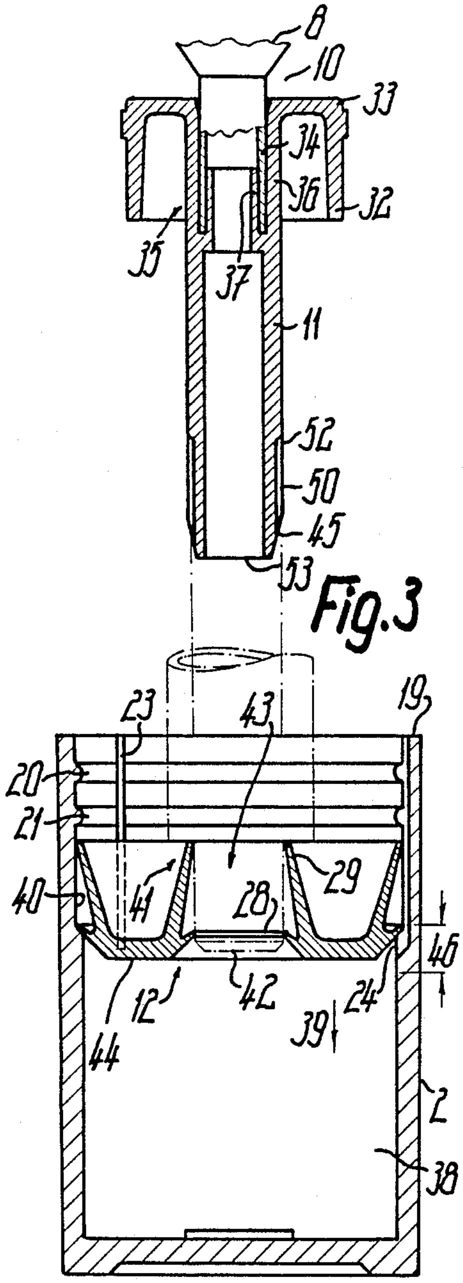
FIG. 3 illustrates the dispenser according to FIG. 1 in the filling position.
Figure 2:
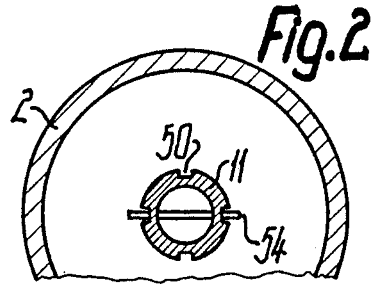
FIG. 2 illustrates a section along lines II-II in FIG. 1.
Figure 4:
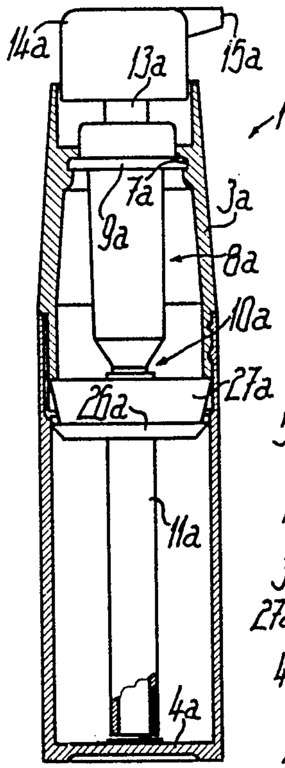
FIG. 4 illustrates another embodiment of a dispenser in axial section.
Figure 5:
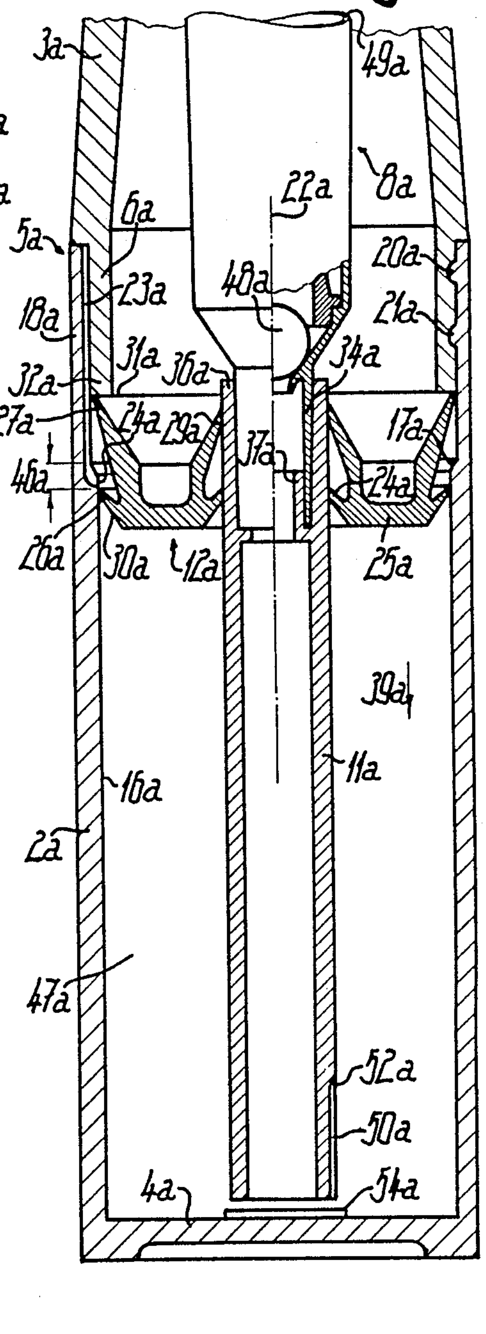
FIG. 5 illustrates a larger scale detail from FIG. 4.

As shown in FIGS. 1 to 3, a dispenser 1 according to the invention has a substantially cylindrical reservoir member 2, which is closed at one end with a base 4 constructed in one piece therein and at the other end 5 with a cap or sleeve-like closure 3. An annular shoulder or closure engages the associated face of reservoir member 2 at the center of the open end 5 of reservoir member 2 with a connecting sleeve 6 projecting over said annular shoulder. The reservoir closure 3 has an annular innner slot 7, in which engages from below a discharge pump 8 with an annular flange 9 formed by its casing and located coaxially with the closure 3 and reservoir member 2, so that it is both radially and axially secured and fixed. With the closure 3 and the discharge pump 8 or annular flange 9, reservoir member 2 bounds the overall reservoir which is hermetically sealed to the outside when pump 8 is in the inoperative position. The end of pump 8 facing base 4 forms part of a plug-in connection 10, via which a riser 11 is coaxially positioned relative to pump 8 and connected thereto. Riser 11 extends virtually to base 4. On riser 11 is guided a drag piston 12, which is displaceably sealed with respect to the inner circumferential surface of reservoir member 2 and with respect to the outer circumferential surface of riser 11. At the outer end, discharge pump 8 has an actuating head 14 guided in reservoir closure 3 on a pump plunger 13 projecting past the outer end of its casing. Head 14 is provided with a radially projecting discharge spout, which defines the discharge opening 15 of the dispenser.

With the portion of its inner surface extending over most of its length and linked with the planar inner face of base 4, reservoir member 2 forms a contact surface or path 16 for drag piston 12. At its end remote from base 4, path 16 passes via a sloping annular shoulder 17 constructed in the manner of a 45 degree bevel into a cross-sectionally, slightly widened reservoir portion 18, which essentially extends up to the open face 19 of reservoir member 2. Adjacent to face 19, the inner face of the reservoir portion 18 is only constricted by two annular beads or tori 20, 21, the internal diameter of the reservoir in the vicinity of said beads being the same, larger or at the most slightly smaller than in the vicinity of path 16. On its outer circumference, connecting sleeve 6 of reservoir closure 3 has complementary annular slots for the engagement of annular beads 20, 21, which are arranged in such a way that when the annular shoulder of closure 3 linked with sleeve 6 engages on face 19, they engage in clip-like, positively engaging and sealing manner with annular beads 20, 21. The inner face of reservoir portion 18 has a plurality of axial slot-like ventilation channels 23 distributed uniformly about the central axis 22 of reservoir member 2, which, in each case, extend from face 19 to annular shoulder 17 and form therein a recessed ventilation opening 24 passing both through annular shoulder 17 and path 16 at the associated end. When the reservoir closure 3 is fitted, the ventilation channels 23 are tightly sealed by it with respect to the outside.

The substantially ring and cup-shaped drag piston 12, which in axial section on either side of its central axis 22 has approximately U-shaped cross sections with profile legs directed away from base 4, is formed at its end facing base 4 by a substantially planar, annular disc-like end wall 25, from whose face remote from base 4 project four ring sealing lips 26, 27, 28 and 29. In each case, two such lips 26, 27 are provided for sealed sliding on contact surface 16 and two lips 28, 29 for sealed sliding on the substantially cylindrical outer circumference of riser 11. The two lower ring sealing lips 26, 28 that do not extend as far along the face of end wall 25 remote from base 4 are located substantially approximately in the vicinity of the thickness of end wall 25. These lips 26, 28 cross-sectionally have a very limited lip length and are inclined by approximately 45 degrees with respect to central axis 22, so that they engage in a relatively hard spring manner on the associated contact surfaces. The engagement of the two ring sealing lips takes place approximately in the same plane at right angles to central axis 22. The two other ring sealing lips 27, 29 are also tapered in thickness in an acute-angled manner towards their free ends. Lips 27, 29 slope under much smaller angles to the associated contact surfaces, so that the ring sealing lip 27 riding on contact surface 16 is conically widened in acute-angled manner to its free face and the other lip 29 is conically tapered in acuteangled manner. The free faces of these two ring sealing lips, and consequently their engagement zones on the associated contact surfaces, are coaxially behind those of ring sealing lips 26, 28 and in a common plane at right angles to central axis 22. The distance between the inner annular bead 21 and annular shoulder 17 is larger than the distance between the contact surface of lips 26 belonging to shoulder 17 and the rear face of lip 27. Thus, with the drag piston 12 inserted according to FIG. 3, its rear face has a smaller clearance from the inner annular bead 21. The flank of the annular sealing lip 26 facing base 4 is formed by a frustum-shaped centering surface 30 on the circumference of drag piston 12, which extends from the face of end wall 25 facing base 4 to the free face of sealing lip 26 in the manner of a camber and appropriately has the same bevel angle as annular shoulder 17. In the relieved state, the external diameter of ring sealing lip 26 is substantially the same as the internal diameter of reservoir portion 18, so that although centered in the arrangement according to FIG. 3, drag piston 12 engages radially in reservoir member 2 without substantial tension and can substantially sealingly engage against annular shoulder 17 under axial pressure thereon with the ring sealing lip 26.

The rear face of end wall 25 of drag piston 12 remote from base 4 forms with its annular zone between the two annular sealing lips 27, 29 an abutment stop 31 for a drive stop 32. Drive stop 32 is combined into a subassembly with discharge pump 8 and/or the reservoir closure 3 and in the represented embodiment is constructed in one piece with riser 11. It is formed by the end of the jacket of a drive cap 33 of riser 11 facing the base 4 or the inner end of riser 11. Its end wall is located in the plane of the outer or base-remote end of the riser 11, which is formed by a plastic injection molded part and passes in one piece into said end. The intenal length of the jacket of cap 33 is the same or slightly larger than the distance between abutment stops 31 and the free end of annular sealing lip 29, so that when drive stop 32 engages on abutment 31 there is no need to fear a compression or crushing stressing of the annular sealing lip 29 by the end wall of drive cap 33.

The plug-in connection 10 between discharge pump 8 and riser 11 also extends over the length of drive cap 33. The end of the casing of discharge pump 8 facing base 4 is formed by a sleeve-like connecting member 34 having a reduced diameter compared with the rest of pump 8 and which tapers slightly conically towards its free end, said member defining the inlet channel of discharge pump 8. The complementary and also sleeve-like connecting member 35 of riser 11 is formed with an end portion 36 tightly embracing the outer circumference of connecting member 34 and an inner sleeve 37 coaxially thereto and which engages in sealed manner into the interior of member 34. Therefore, by pressing connecting members 34, 35 into one another, there is a frictional engagement, and an extremely firm, strong connection.

For limiting the filling chamber 38 in reservoir member 2, the drag piston 12 is inserted so far into reservoir member 2 that its front, outer annular sealing lip 26 in the drag direction engages with the flank associated with centering surface 40 on annular shoulder 17, so that the radially outer annular sealing lips 26, 27 engage with their sealing edges exclusively on the inner circumferential surface 40 of reservoir portion 18 and are not yet transferred to the contact surface 16. As the riser 11 or discharge pump 8 has not yet been inserted in drag piston 12, the radially inner annular sealing lips 29, 28 of piston 12 can be used as a connecting piece 41 for a filling nozzle 42 indicated in dot-dash manner in FIG. 3, i.e., lips 29, 28 bound a filling opening 43.

Filling nozzle 42 preferably only engages so far into the annular sealing lips 29, 28 that its front end does not project beyond the front piston end 44 facing base 4. In this state, the filling chamber 38 is connected to the ventilation opening 24. On forcing the medium into reservoir member 2 through the filling nozzle 42, air can escape into the atmosphere from filling chamber 38 through ventilation channels 23 until chamber 38 is completely filled, without air inclusions, from base 4 to drag piston 12. It is conceivable to make the filling nozzle 42 sufficiently long so that its end is located in the vicinity of base 4 at the start of filling and is drawn outwards with increased filling and with the drag piston kept stationary.

After filling, filling nozzle 42 is of withdrawn from the drag piston 12 or connecting piece 41. Drag piston 12 is not moved with respect to reservoir member 2, which is relatively simple to achieve because piston 12 is now secured in its position with respect to reservoir member 2 by the medium filling chamber 38. After removing the filling nozzle 42, a previously fitted subassembly comprising riser 11, discharge pump 8 and reservoir closure 3 is inserted in the open end of reservoir member 2. Initially the inner end 45 of riser 11, which is conically tapered in acute-angled manner, is inserted in annular sealing lip 29, 28 until the drive stop 32 engages on the abutment 31 of drag piston 12. Reservoir closure 3 has not yet reached its fitting end position with respect to reservoir member 2. On further insertion of reservoir closure 3 or riser 11, the drive stop 32 moves the drag piston 12 by a predetermined initial drive stroke 46, so that the annular sealing lip 26 jumps over the annular shoulder 17, reaches contact surface 16 and simultaneously closes the ventilation openings 24 with respect to the interior of the reservoir. At the end of this initial drive stroke, the reservoir closure 3 is in its end fitting position relative to reservoir member 2 and drag piston 12 is, according to FIG. 1, in its starting working position, i.e., now a storage chamber or space 47 is defined in reservoir member 2. Both through the introduction of riser 11 into reservoir member 2 and by movement along the drive stroke 46 of drag piston 12, during the described filling of the dispenser, part of the medium introduced into reservoir member 2 is displaced and can give way by rising in riser 11 and penetrating chamber 58 of discharge pump 8. In order that the chamber 58 of discharge pump 8 be ventilated during this initial filling, the pump is kept at the end of its pump stroke.

In the represented embodiment, discharge pump 8 is constructed as a piston pump which, between pump piston 56 and riser 11, has a check valve 48 opening towards the discharge opening 15 and which is immediately adjacent to the connecting member 34 in casing 49 of pump 8. Casing 49 of pump 8 forms a cylinder with a piston contact surface or path 55 for a pump piston 56 which, with the pump plunger 13, forms a piston unit. The pump piston 56 is guided with a conically widened piston lip on the piston path 55 and defines a pump chamber 58 with the cylinder and suction valve formed by check valve 48. The discharge channel of pump chamber 58 is provided as an internal channel in the piston unit and, although interposing a delivery valve, passes through the pump plunger 13 to the discharge opening 15. The delivery valve body is appropriately constructed in one piece with pump piston 56 and has an annular bead spaced behind its piston lip on the inner circumference, which, when the delivery valve is in the closed position, engages on a circular valve seat of pump plunger 13. Behind or above said valve body, the pump piston 56 is constructed in one piece with a piston neck 59 sealingly surrounding the pump plunger 13 which can be resiliently compressed under axial compressive stressing. Facing the pump piston 56, the piston path 55 terminates in an inner annular shoulder 57, against which abuts the associated end of the pump piston 56 at the end of the pump stroke. Over and beyond this position, pump plunger 13 can still be moved slightly with respect to the cylinder, so that the pump piston 56 is fixed with respect to the cylinder by annular shoulder 57 and moves upwards under axial crushing of piston neck 59 relative to pump plunger 13 and the valve body of pump piston 56 is raised from the valve seat. Thus, from this instant, the delivery valve is opened and after the return of the pump plunger 13 the valve closing path is again closed at the start of the return stroke by the resilient force of the piston neck 59.

The outer or upper end of the casing 49 of discharge pump 8 is closed by a cylindrical cover 60, which forms the annular flange 9 projecting over its outer circumference adjacent to its lower face and has a passage opening for the piston unit or pump plunger 13 located in the pump axis. The annular clearance between said passage opening and the piston unit forms part of a connection serving as an air compensating means 61 between the atmosphere and the interior of casing 49 separated from pump chamber 58 by pump piston 56 which is located above pump chamber 58 between cylinder cover 60 and the lip of pump piston 56. This space is connected by an opening 62 in casing 49 to the empty space 51 of the complete reservoir located above drag piston 12 and surrounding discharge pump 8.

Above the piston lip in the vicinity of its axial portion where the delivery valve body is located, and consequently in the transition zone between pump piston 56 and piston neck 59, an air compensating means 61 is provided, namely an air compensating valve 63 which is forcibly closed when discharge pump 8 is in the inoperative position and which is only open during the pump stroke and the return stroke of pump piston 56. This air compensating valve 63 has a frustum-shaped, upwardly tapered valve body 64 constructed in one piece with the pump piston 56 or the piston neck 59. A valve seat 65 is associated with neck 59 at the lower end of the inner bushing of cylinder cover 60 defining the passage opening and which engages casing 49. In the inoperative position, the valve body 64 engages, in hermetically sealing manner, on valve seat 65 under the tension of a restoring spring (not shown), which acts on the piston unit and is arranged in casing 49 or pump chamber 58 along the pump axis, so that the inoperative position of the piston unit, it is also fixed by abutment. Instead of this constantly closed air compensating means in the inoperative position of discharge pump 8, it would also be possible to provide an air compensating opening for the empty space 51 directly in the overall reservoir wall, e.g., in the reservoir member 2 or closure 3 and which would constantly be open; but then a sterile sealing of empty space 51 would not be possible. The described discharge pump 8 constitutes a type of atomizing pump which, particularly as a result of the delivery valve described, operates with a relatively high pump pressure.

As shown in FIGS. 1 to 3, on the outer circumference of the inner end portion of riser 11, there are four ventilation channels 50 uniformly distributed over the circumference in the form of axial slots of identical length and which extend up to the associated free ends of riser 11. If, after expelling the filling from storage chamber 47, the front end 44 of drag piston 12 has reached the base 4 of reservoir 2, then the rear end of the annular sealing lip 29 frees the associated ends 52 of ventilation channels 50, i.e., the empty space 51 of reservoir member 2 located behind the drag piston 12 is now connected via a ventilation connection to the inner end 53 of riser 11. Thus, any medium still in riser 11 or in the chamber of discharge pump 8 can be discharged through the discharge opening 15 by further actuation of discharge pump 8 until riser 11 and pump 8 have been completely emptied. A spacer 54 for the inner end face of riser 11 is provided on base 4 of reservoir 2, so that it cannot accidentally abut against base 4 in such a way that it is closed by it. Spacer 54, is smaller, as shown in the axial view of FIG. 2, then the internal cross-section of riser 11 and is formed in the represented embodiment by a web diametrically positioned with respect to the riser 11.

In FIGS. 4 to 8, corresponding parts are given the same reference numerals as in FIGS. 1 to 3, but the letter "a" has been added thereto.

In the embodiment according to FIGS. 4 to 8, the drive stop **32*a* is directly formed by the reservoir closure 3*a*, namely by the end of its connecting sleeve 6*a*. The arrangement can be such that the drive stop 32*a* is not positioned outside the sealing members of the drag piston 12*a* and instead engages on the rear end face of said piston 12*a*, which is formed by the radially outer, rear annular sealing lip 27*a*, so that its rear face forms the abutment stop 31*a* and the riser 11*a* requires no special construction at the rear end. This embodiment is particularly appropriate if the annular sealing lip 27*a* is relatively thick and therefore no damage by the engagement position is likely. However, it is also conceivable to provide an engagement shoulder for the drive stop 32a on the inner circumference of annular sealing lip 27a, so that there is no need for a direct contact between the sealing surface of lip 27a and the stop 32a**.

Figures 6, 7, 8:
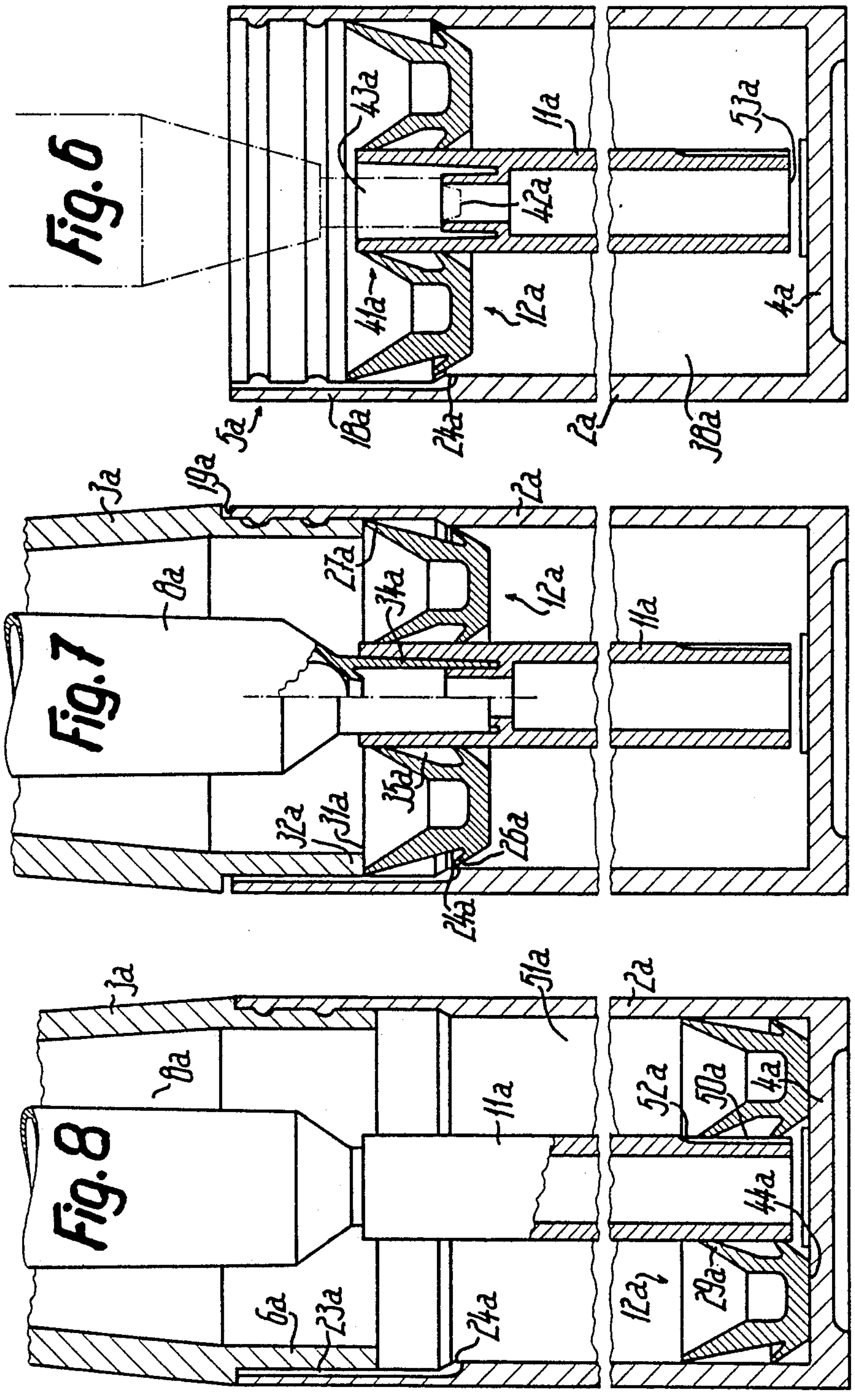
FIG. 6 illustrates the dispenser of FIG. 5 in the filling position.
FIG. 7 illustrates the dispenser of FIG. 5 shortly before the end of the transfer to the starting working position of FIG. 5.
FIG. 8 illustrates the dispenser of FIG. 5 at the end of the complete drag piston stroke.

In the embodiment according to FIGS. 4 to 8, the filling of the filling chamber 38a can also directly take place through the drag piston 12a. As shown in FIG. 6, filling can also take place through the riser 11a, i.e., prior to filling, riser 11a is introduced into reservoir member 2a, in addition to the drag piston 12a. In this case, the outer end of riser 11a forms the filling opening 43a or the connecting piece 41a for the filling nozzle 42a indicated in dot-dash manner. In this manner of filling, it is also possible to reliably and simply ensure that the medium passing out of the lower end 53a of riser 11a into the filling chamber 38a rises from base 4a up to the drag piston 12a without any risk of air inclusions. Following the filling and removal of filling nozzle 42a, the subassembly comprising the reservoir closure 3a and discharge pump 8a is fitted in the described manner, the connecting member 34a of discharge pump 8a being telescopically connected with the connecting member 35a of riser 11a. The drag piston 12a is carried along by the drive stroke 46a into its working position according to FIG. 5. Thus, the dispenser is ready to operate, i.e., a precise quantity of medium can be discharged during the first pump stroke without any need for idle strokes.

FIG. 8 shows the lower end position of drag piston 12a, in which in the manner of a slide control, the rear ends 52a of ventilation channels 50a are released by the associated annular sealing lip 29a of drag piston 12a. The air permeability between the outer circumference of the riser and the drag piston desired for ventilation purposes in this position can also be obtained through suitable surface characteristics at the lower end of the riser, so that there is no need for separate slot-like ventilation channels. For example, said surface can be made so rough or provided with grooves in the vicinity of the free end of the riser, that between it and the associated annular sealing lip of the drag piston a plurality of capillary or labyrinth like air passages are formed on the last part of the piston travel.

Figure 9:
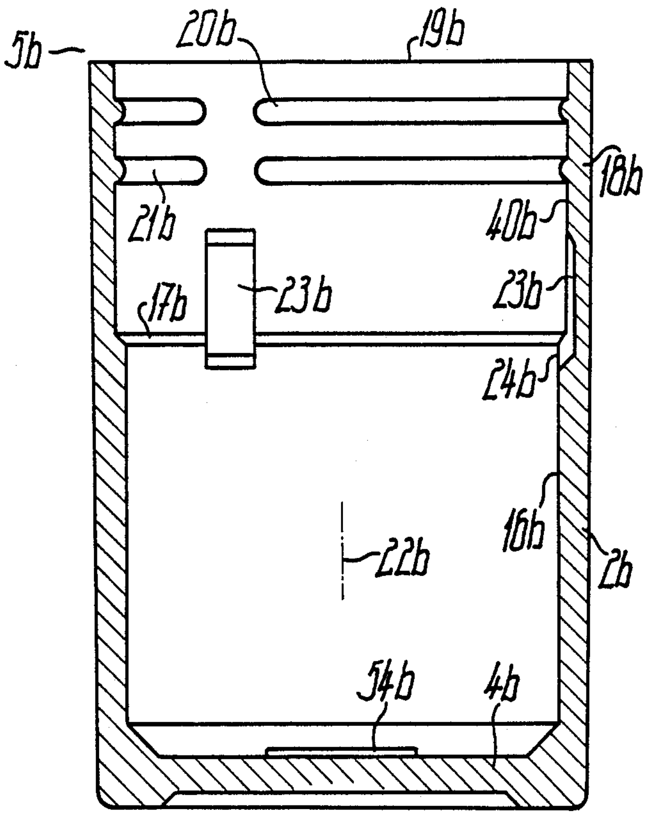
FIGS. 9 and 10 illustrate the lower part of the reservoir of a further embodiment in axial section and in plan view.
Figure 10:
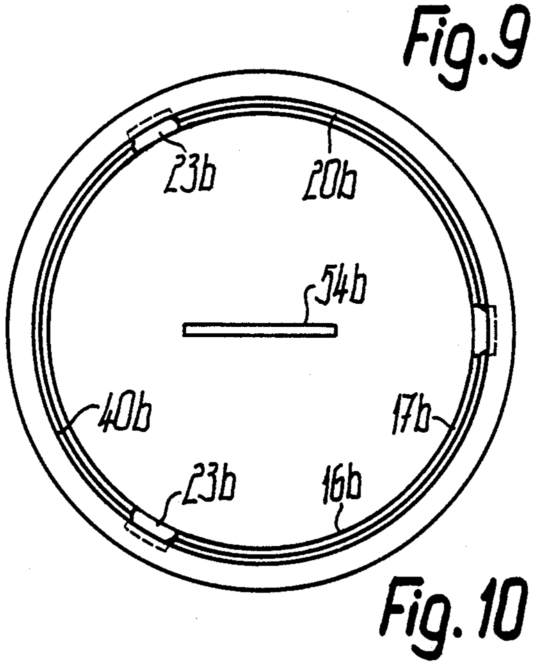

FIGS. 9 and 10 use, for the corresponding parts, the same reference numerals as in the preceding drawings, but the letter "b" has been added. In this embodiment, the ventilation channels 23b do not extend up to the open end face 19b of reservoir member 2b and are instead formed by pocket-like depressions bounded on all sides in the inner face of reservoir member 2b and which extend in slot-like manner from the piston path 16b into the inner circumferential surface 40b of the reservoir portion 18b. Ventilation channels 23b end on the side remote from the free end face 19b of the annular beads 20b, 21b which in conjunction with the reservoir closure form sealing members and which instead of being continuously closed over their circumference are provided with depressions or interruptions, can be located in the form of an extension of the associated ventilation channel 23b parallel to the central axis 22b. When the reservoir closure is fitted, it engages sealingly into the annular groove defined by the two annular beads 20b, 21b by a ring part which is completely closed over the circumference and which is provided on the outer circumference of the connecting sleeve of the reservoir closure between the slots intended for the engagement of the beads 20b, 21b. Thus, unlike the embodiment according to FIGS. 1 to 3, the ventilation channels 24b are not sealed from the outside by the reservoir closure in the vicinity of the open end face 19b and are instead closed by a seal located in the vicinity of the circumferential surfaces with the container closure mounted. This can have both a radial and axial sealing pressing action and consequently permits a hermetic closure. Thus, the maximum storage time of the filled dispenser can be further extended without any risk of the content being spoiled. It is also conceivable to provide projections sealingly engaging into the ventilation channels on the outer circumference of the connecting sleeve of the reservoir closure. In any case, the air-tight seal between reservoir closure and reservoir must be such that it withstands an overpressure of at least 0.5 bar. As is also shown in FIG. 9, the transition between the piston path 16b and the inner face of base 4b is frustum-shaped on the centering face 30 of the drag piston in such a way that when the latter is in its lower position it engages in substantially gap-free manner with its centering face on said transition surface and there is substantially no cavity left between the piston and the riser.

What is claimed is:

1. A dispenser for a fluid medium, operable for dispensing paste-like pharmaceutical and cosmetic substances by a pumping operation, comprising:

a reservoir member defining a reservoir for storing the fluid medium, having a filling opening for engaging means for conveying the fluid medium into the reservoir through the filling opening during a filling operation of the dispenser, to establish an at least partly filled operational condition of the dispenser, and having at least one closable ventilation opening;

a reservoir piston having at least part of the filling opening formed therethrough and having means for closing the at least one ventilation opening;

means for engaging and releasably securing the reservoir piston at a filling position in the reservoir member, for engagement with the conveying means during the filling operation, and thereafter, for enabling the reservoir piston to be moved from the filling position to a range of operational positions in the reservoir for dispensing the fluid medium, one of the operational positions being a storage position; and, the at least one closable ventilation opening being disposed in the vicinity of the filling position, the at least one ventilation opening being open for communication with the reservoir when the reservoir piston is in the filling position for venting the reservoir during a filling operation and being closed off from communication with the reservoir when the reservoir piston is in the operational positions.

2. A dispenser according to claim 1, wherein the reservoir piston has an opening defining an inwardly facing annular surface, the surface defining the filling opening.

3. A dispenser according to claim 1, further comprising a riser duct passing through said filling opening for dispensing the fluid medium from the reservoir, said riser duct having an outer end leading to a discharge opening of the dispenser, said riser duct having an inner end projecting into the reservoir, said reservoir piston being slidably guided along the riser duct during movement in the operating range.

4. A dispenser according to claim 3, wherein the riser duct is adapted for insertion through the filling opening during the filling operation, the inner end of the riser duct being a free end tapered to a width smaller than an inner width of the filling opening.

5. A dispenser according to claim 3, wherein the reservoir piston is provided with at least two successive annular sealing lips for guiding engagement with the riser duct.

6. A dispenser according to claim 3, wherein the reservoir member has a closed base and an open end opposite thereto, the riser duct having at least one venting channel, said venting channel extending on the riser duct from the vicinity of the closed base of the reservoir member to provide an opening vent connection from an empty space, defined by the open end portion of the reservoir member and the reservoir piston in the storage position of said reservoir, to the inner end of the riser duct adjacent to the closed base of the reservoir member, the venting channel having an end remote from the closed base, and the reservoir piston having at least one inner sealing lip adapted to pass over the remote end of the venting channel just before the reservoir piston reaches the inner end of the riser duct when moving toward the closed base, thereby automatically slidably controlling opening and closing of the venting channel.

7. A dispenser according to claim 1, wherein said reservoir piston has at least one inner sealing lip within the filling opening which bounds a coupling member for receiving a filling nozzle.

8. A dispenser according to claim 7, wherein said at least one inner sealing lip of the reservoir piston is a rear and annular sealing lip, the rear and annular sealing lip forming the coupling member for the filling nozzle.

9. A dispenser according to claim 1, wherein the closing means comprises means for positively closing off the ventilation opening upon displacement of the reservoir piston from the filling position, over a predetermined stroke length, to the storage position.

10. A dispenser according to claim 9, wherein the ventilation opening is closeable with respect to the reservoir by a slide member.

11. A dispenser according to claim 10, wherein the reservoir piston forms the slide-member operative to uncover the ventilation opening in the filling position and to cover the ventilation opening in the storage position.

12. A dispenser according to claim 10, wherein the slide-member comprises at least one annular sealing lip disposed on the reservoir piston, the at least one annular sealing lip having a sealing face.

13. A dispenser according to claim 10, wherein said slide-member comprises an outer piston lip on the reservoir piston, sealing the reservoir by engaging a guide path formed by said reservoir member in the operational positions.

14. A dispenser according to claim 10, wherein the slide-member projects at an angle from the reservoir piston oppositey to the direction of the filling operation stroke and.

15. A dispenser according to claim 10, wherein the reservoir piston has a front piston end facing in the direction of the filling operation stroke, the slide-member being disposed in the vicinity of the front piston end.

16. A dispenser according to claim 9, wherein the ventilation opening is atmospherically vented by a ventilation channel defined by a pocket in an inner circumferential surface of an open end portion of the reservoir member, the ventilation channel having an inner end forming the ventilation opening.

17. A dispenser according to claim 16, further comprising a seal proximate an outlet end of the ventilation channel from the ventilation opening, and reservoir closure means, the seal being disposed between the reservoir member and the reservoir closure means, for sealingly closing the ventilation channel.

18. A dispenser according to claim 1, wherein the reservoir member has an open end for receiving a discharge pump, the discharge pump having a pump chamber and a riser duct connecting the pump chamber to the reservoir, the riser duct extending through the filing opening, whereby the reservoir, the riser duct and the pump chamber define a common reception volume completey fillable with the fluid medium by the filling operation by the means for conveying the fluid medium.

19. A dispenser according to claim 18, wherein the reservoir piston is adapted for displacement over a filling operation stroke for filling the pump chamber and the riser duct, the displacement of the reservoir piston over the filling operation stroke corresponding to a decremental volume substantially equal to the reception volume of the pump chamber and the riser duct.

20. A dispenser according to claim 18, wherein one end of the riser duct forms a duct coupling member for a coupling for connecting a pump coupling member of the discharge pump to the riser duct.

21. A dispenser according to claim 20, wherein the pump coupling is formed by a socket of the discharge pump and the duct coupling is a socket of the riser duct externally embracing the socket of the discharge pump.

22. A dispenser according to claim 20, wherein the duct coupling member of the riser duct forms an inner sleeve engaging in the pump cooling member of the discharge pump.

23. A dispenser according to claim 18, wherein the discharge pump comprises a piston pump having a check valve between a pump piston and the riser duct.

24. A dispenser according to claim 23, wherein the check valve is a ball valve.

25. A dispenser according to claim 18, wherein the reservoir member and the outer face of the reservoir piston define an empty space and further comprising means for atmospherically sealing the empty space in an initial pump operational position of the discharge pump.

26. A dispenser according to claim 18, wherein the discharge pump has a pump casing sealably inserted in the reservoir member and said reservoir piston forms a drag piston.

27. A dispenser according to claim 26, wherein the pump casing of the discharge pump is provided with an annular flange, and further comprising a reservoir closure means, the annular flange being sealably insert in an inner slot of the reservoir closure means, the discharge pump being provided with an air pressure compensating means for venting an empty space defined by the reservoir member and that side of the reservoir piston facing the open end of the reservoir member, said pressure compensating means being tightly closed in an initial pump operational position of the discharge pump.

28. A dispenser according to claim 1, wherein the reservoir piston is shaped as an annular cup.

29. A dispenser according to claim 1, wherein the reservoir piston is provided with at least two successive annular sealing lips for guiding engagement with the reservoir member, said sealing lips have sealing faces.

30. A dispenser according to claim 29, wherein said at least two successive annular sealing lips project, in cross-section, in a sloping manner relative to the sealing faces and counter to the direction of a filling operation stroke of the reservoir piston, as defined by the displacement thereof from said filling position to said storage position.

31. A dispenser according to claim 1, wherein the dispenser comprises a pump adapted for atomizing highly fluid media and the reservoir piston is constructed for moving in the reservoir member upon operation of the atomizing pump.

32. A dispenser for a fluid medium, operable for dispensing paste-like pharmaceutical and cosmetic substances by a pumping operation, comprising:

a reservoir member defining a reservoir for storing the fluid medium, having a filling opening for engaging means for conveying the fluid medium into the reservoir through the filling opening during a filling operation of the dispenser, to establish an at least partly filled operational condition of the dispenser, and having at least one closable ventilation opening;

a reservoir piston having said filling opening formed therethrough and insertable in an insertion direction into the reservoir member into a filling position during the filling operation, being thereafter displaceable by a stroke in the insertion direction into a range of operational positions in the reservoir for dispensing the fluid medium, including an initial operational position, the reservoir piston having means for closing the at least one ventilation opening and having an outer face directed away from the reservoir and forming an abutment stop;

a piston driving member for engaging the abutment stop and moving the reservoir piston through the stroke in the insertion direction from the filling position to the initial operational position after the filling operation;

the at least one closable ventilation opening being disposed in the vicinity of the filling position, the at least one ventilation opening being open for communication with the reservoir when the reservoir piston is in the filling position for venting the reservoir during the filling operation and being closed off from communication with the reservoir when the reservoir piston is displaced from the filling position to the initial operational position; and, the reservoir piston defines two nearly coextensive chambers in the reservoir, a filling chamber being defined by the reservoir piston in the filling position and a storage chamber being defined by the reservoir piston in the initial operational position, the storage chamber being smaller in volume than the filling chamber by a decremental volume and being shorter than the filling chamber by an amount corresponding to the length of the stroke of the reservoir piston from the filling position to the initial operational position.

33. A dispenser according to claim 32, wherein the reservoir member has an open end for receiving a discharge pump, and further comprising a reservoir closure means for closing the open end of the reservoir member, the piston driving member and the reservoir closure means forming a sub-assembly carrying the discharge pump.

34. A dispenser according to claim 32, further comprising a riser duct for the fluid medium projecting into the reservoir through the filling opening, the piston driving member being constructed in one piece with the riser duct.

35. A dispenser according to claim 32, wherein the reservoir piston has at least one sealing member and the piston driving member has a drive cap engaging said reservoir piston inside of the reservoir member, adjacent to the sealing member of the reservoir piston.

36. A dispenser according to claim 32, wherein the reservoir member defines a guide path and a widened reservoir portion, the widened reservoir portion having a slightly wider internal cross-section than an internal cross-section of the guide path, the reservoir piston being located in the vicinity of the widened reservoir portion in the filling position.

37. A dispenser according to claim 36, wherein the reservoir member has an open end face, the widened reservoir portion extending up to the open face of the reservoir member.

38. A dispenser according to claim 36, wherein said reservoir member has an internal sloping shoulder connecting said widened reservoir portion to the guide path.

39. A dispenser according to claim 38, further comprising a slide-member on and extending outwardly from the reservoir piston and wherein the internal sloping shoulder forms a means for releasably positioning the slide-member in the filling position, the internal sloping shoulder being transversed by a groove defining the ventilation opening.

40. A dispenser for a fluid medium, operable for dispensing paste-like pharmaceutical and cosmetic substances by a pumping operation, comprising:

a reservoir member defining a reservoir for storing the fluid medium, having a filling opening for engaging means for conveying the fluid medium into the reservoir through the filling opening during a filling operation of the dispenser, to establish an at least partly filled operational condition of the dispenser, and having at least one closable ventilation opening for venting the reservoir during the filling operation a reservoir piston insertable in an insertion direction into the reservoir member into a filling position during the filling operation, being thereafter displaceable by a stroke in the insertion direction into a range of operational positions in the reservoir for dispensing the fluid medium, including an initial operational position, the reservoir piston having means for closing the at least one ventilation opening, the at least one ventilation opening being closed off from communication with the reservoir when the reservoir piston is displaced from the filling position to the initial operational position; and, the reservoir piston defines two nearly coextensive chambers in the reservoir, a filling chamber being defined by the reservoir piston in the filling position and a storage chamber being defined by the reservoir piston in the initial operational position, the storage chamber being smaller in volume than the filling chamber by a decremental volume.

* * * * *

UNITED STATES PATENT AND TRADEMARK OFFICE
CERTIFICATE OF CORRECTION

PATENT NO. : 4,817,829

DATED : April 4, 1989

INVENTOR(S) : Karl-Heinz Fuchs, Lothar Graf and Heinz-Peter Forsbach

It is certified that error appears in the above-identified patent and that said Letters Patent is hereby corrected as shown below:

Column 7, line 20, delete "spring" and insert --springy--.

Column 10, line 50 delete "then" and insert --than--.

Signed and Sealed this

Seventh Day of April, 1992

*Attest:*

HARRY F. MANBECK, JR.

*Attesting Officer* *Commissioner of Patents and Trademarks*